(12) United States Patent
Katano

(10) Patent No.: US 8,055,061 B2
(45) Date of Patent: Nov. 8, 2011

(54) METHOD AND APPARATUS FOR GENERATING THREE-DIMENSIONAL MODEL INFORMATION

(75) Inventor: Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 12/035,522

(22) Filed: Feb. 22, 2008

(65) Prior Publication Data
US 2008/0204453 A1   Aug. 28, 2008

(30) Foreign Application Priority Data
Feb. 27, 2007   (JP) .................. 2007-047883

(51) Int. Cl.
*G06K 9/00* (2006.01)
(52) U.S. Cl. ........ 382/154; 382/103; 382/284; 382/285; 345/633
(58) Field of Classification Search ............ 382/154, 382/103, 284, 285; 345/629–633
See application file for complete search history.

(56) References Cited

U.S. PATENT DOCUMENTS
2004/0130579 A1 * 7/2004 Ishii et al. .............. 345/848

FOREIGN PATENT DOCUMENTS
JP    10-176919    6/1998

OTHER PUBLICATIONS
Billinghurst et al., "Mixing Realities in Shared Space; Anu augmented Reality Interface for Collaborative Computing", Aug. 2002. IEEE International Conference on Multimedia and Expo, vol. 3, p. 1641-1643.*

* cited by examiner

*Primary Examiner* — Aaron W Carter
(74) *Attorney, Agent, or Firm* — Cowan, Liebowitz & Latman, P.C.

(57) ABSTRACT

A method forms a region image extracting a region of a physical object which generates three-dimensional model information from a video image of physical space. Then, from position and orientation information for the physical object and from the region image, a primitive virtual object of a size to encompass the region image is generated. From the primitive virtual object a virtual object having a shape according to the region image is generated, and the three-dimensional model information is generated as three-dimensional model information representing the physical object.

10 Claims, 5 Drawing Sheets

METHOD AND APPARATUS FOR GENERATING THREE-DIMENSIONAL MODEL INFORMATION

BACKGROUND OF THE INVENTION

1. Field of the Invention

The present invention relates to computer graphics technology, and more particularly, to technology for generating three-dimensional model information for a physical object to be used in rendering a three-dimensional object.

2. Description of the Related Art

Computer graphics (CG) technology is widely used in a variety of fields. In recent years in particular, with advances in three-dimensional CG technology, application to solid object simulation is common.

As an example application of three-dimensional CG technology, mixed reality systems are known. A mixed reality system is a system that represents a virtual object as seen from the viewpoint of an observer in CG and registers and superimposes it on an actual image sensed from the vicinity of the viewpoint of the observer. By observing a superimposed image of the CG and the actual image according to the viewpoint position of the observer, the observer is able to experience a mixed reality in which there appears to be a virtual object in physical space. Compared to a conventional virtual reality system (VR system), a mixed reality system makes possible more realistic observation, with a sense of actual scale.

Using mixed reality systems, attempts have been made to carry out various types of inspections, such as usability, maintainability, and assemblability, of objects designed using three-dimensional CAD. For example, methods have been proposed in which, by representing a prototype as a three-dimensional virtual object using CG and displaying it according to motions of a hand, which is a physical object, manipulation and inspection are carried out with one's own hand as if the prototype were there. In this case, the hand of the operator must also be represented as a three-dimensional virtual object by CG and display in accordance with actual hand and finger motions must be carried out.

When manipulating another virtual object (such as the prototype described above) with a hand (virtual hand) represented by CG, it is necessary to carry out a determination of contact between the virtual hand and the other virtual object. At this time, if the shape of the virtual hand is too real, the determination process becomes complicated. As a result, the virtual hand is often represented by a simplified-shape model without detailed information such as the fingernails and the like and the contact determination carried out.

However, because a virtual hand reflects the motion and the position and orientation of the physical (real) hand, if the shape of the virtual hand differs too greatly from the shape of the real hand the operator experiences a sense of incongruence.

In order to display a virtual hand that matches motions of the real hand it is necessary to detect the state of the real hand, specifically by using methods like the following:

(1) A method that mounts on the real hand sensors that detect amounts of deformation and measures the state of the hand (Japanese Patent Laid-Open No. 10-176919)

(2) A method that senses a real hand and deduces the shape of the three-dimensional hand from the image of the two-dimensional hand.

With method (1), attaching the sensors is difficult and time-consuming, and where the detected deformation amount is not accurate a discrepancy arises between the shape of the virtual hand and that of the real hand. In addition, with method (2), the calculating load to compute the shape of the three-dimensional hand from the image of the two-dimensional hand is very great, and given current computational device capabilities it is not possible to apply this method to mixed reality systems, which require computation in real-time.

SUMMARY OF THE INVENTION

The present invention is conceived in light of the problems of the conventional art described above, and provides a method and an apparatus for generating three-dimensional model information capable of obtaining, by a simplified method, three-dimensional model information for a physical object.

According to an aspect of the present invention, there is provided a method of generating three-dimensional model information for a physical object for displaying the physical object as a three-dimensional virtual object according to a viewpoint position and an orientation of an observer, comprising: an acquisition step of acquiring a video image of physical space according to the viewpoint position and the orientation of the observer; an extraction step of extracting a region of the physical object from the video image of the physical space; a first generation step of generating a primitive virtual object having a position and orientation corresponding to a position and orientation of the physical object, the primitive virtual object having a size to encompass the extracted region; a second generation step of generating a virtual object corresponding to a shape of the extracted region from the primitive virtual object; and a model information generation step of generating three-dimensional model information for the virtual object generated in the second generation step as three-dimensional model information for the physical object.

According to another aspect of the present invention, there is provided an apparatus for generating three-dimensional model information for a physical object for displaying the physical object as a three-dimensional virtual object according to a viewpoint position and an orientation of an observer, comprising: an acquisition unit which acquires a video image of physical space according to the viewpoint position and the orientation of the observer; an extraction unit which extracts a region of the physical object from the video image of the physical space; a first generation unit which generates a primitive virtual object having a position and orientation according to a position and orientation of the physical object, the primitive virtual object having a size to encompass the extracted region; a second generation unit which generates a virtual object corresponding to a shape of the extracted region from the primitive virtual object; and a model information generation unit which generates three-dimensional model information for the virtual object generated by the second generation unit as three-dimensional model information for the physical object.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
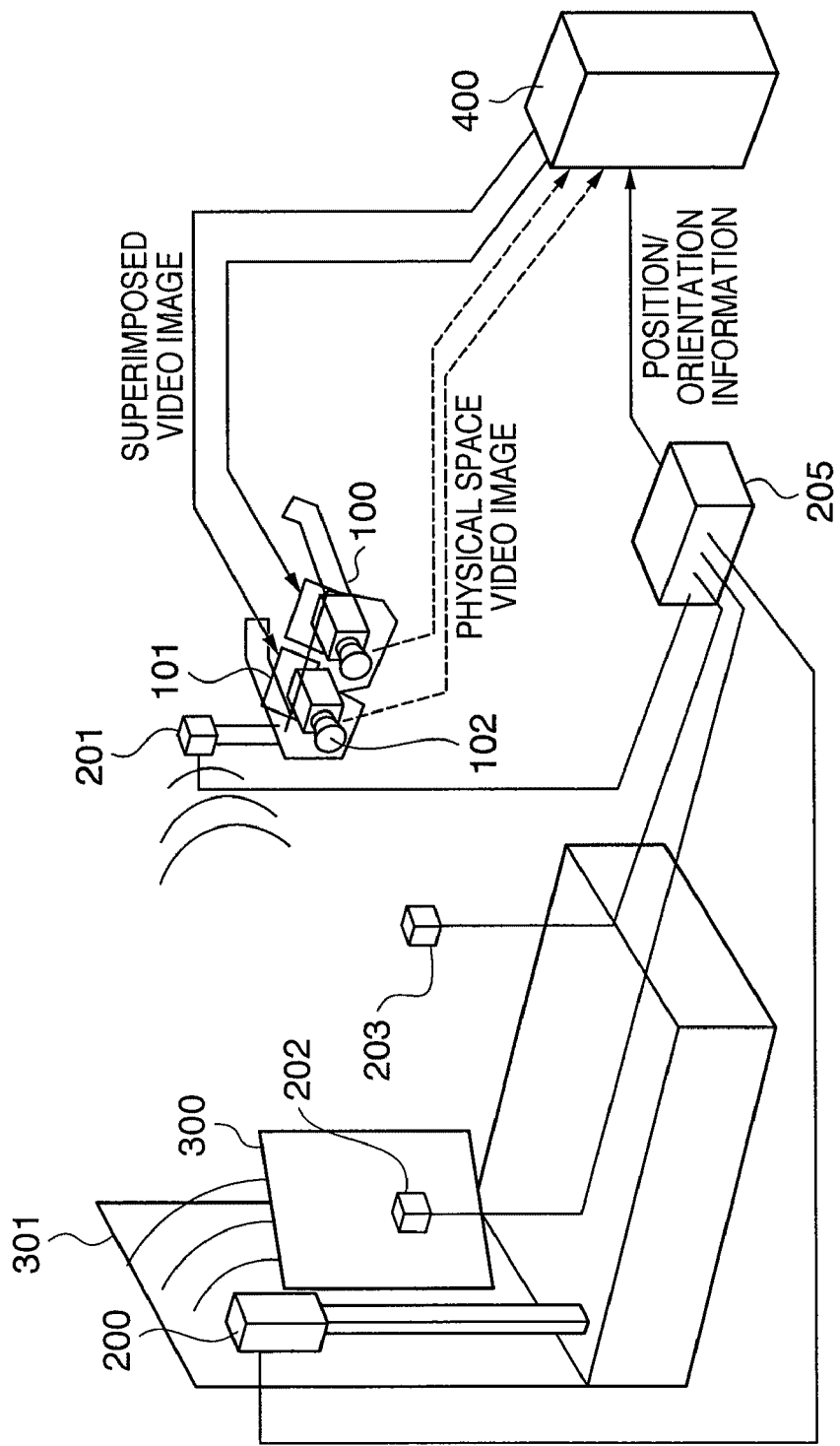
FIG. 1 is a diagram showing an example configuration of a mixed reality system as one example of a three-dimensional model information generating apparatus according to an embodiment of the present invention.

FIG. 1 is a diagram showing an example configuration of a mixed reality system as one example of a three-dimensional model information generating apparatus according to an embodiment of the present invention.

In the mixed reality system of the present embodiment, a head mounted display (HMD) 100 is a display device that an observer attaches to his/her head and uses. The HMD 100 of the present embodiment is a video see-through-type stereo HMD, in which a video image display device 101 capable of displaying separate images for the right eye and the left eye independently is incorporated. As a result, by displaying an appropriate parallax image for the right eye and the left eye, stereoscopic vision with the naked eye is possible. In addition, for example, a video image input device 102, which is a video camera, is provided at left and right positions in the vicinity of the eyes of the observer when the observer attaches the HMD 100, so as to be able to acquire a parallax image of physical space according to the observer's viewpoint position and line of sight direction.

In addition, in the mixed reality system of the present embodiment, magnetic sensors are used as means to detect physical three-dimensional position and orientation, such as the observer's viewpoint position and orientation and the like. Specifically, a magnetic field generated by a magnetic transmitter 200 is detected by magnetic sensors 201-203 and the detection results are used by a position/orientation detection device 205 to compute the position and orientation of the magnetic sensors 201-203. Of the magnetic sensors 201-203, the magnetic sensor 201 is mounted on the HMD 100, and the viewpoint position and line of sight direction of the observer is computed by the position/orientation detection device 205.

A tray 300 is one example of a prototype that the observer holds in his or her hand and manipulates. The magnetic sensor 202 is incorporated in the tray 300, and the position and orientation of the tray 300 is computed at the position/orientation detection device 205. An observation stand 301 is a stand for observing a work space.

The remaining magnetic sensor 203 is attached to the observer's hand, and the position/orientation of the observer's hand is computed at the position/orientation detection device 205.

The information processing apparatus 400 generates a CG video image of the virtual object according to the position/orientation information computed by the position/orientation detection device 205. Then, the information processing apparatus 400 generates a superimposed image in which the CG video image is registered and superimposed on a video image of physical space obtained from the video image input device 102 of the HMD 100, and the superimposed image is displayed on the video image display device 101.

(Information Processing Apparatus 400)

Figure 2:
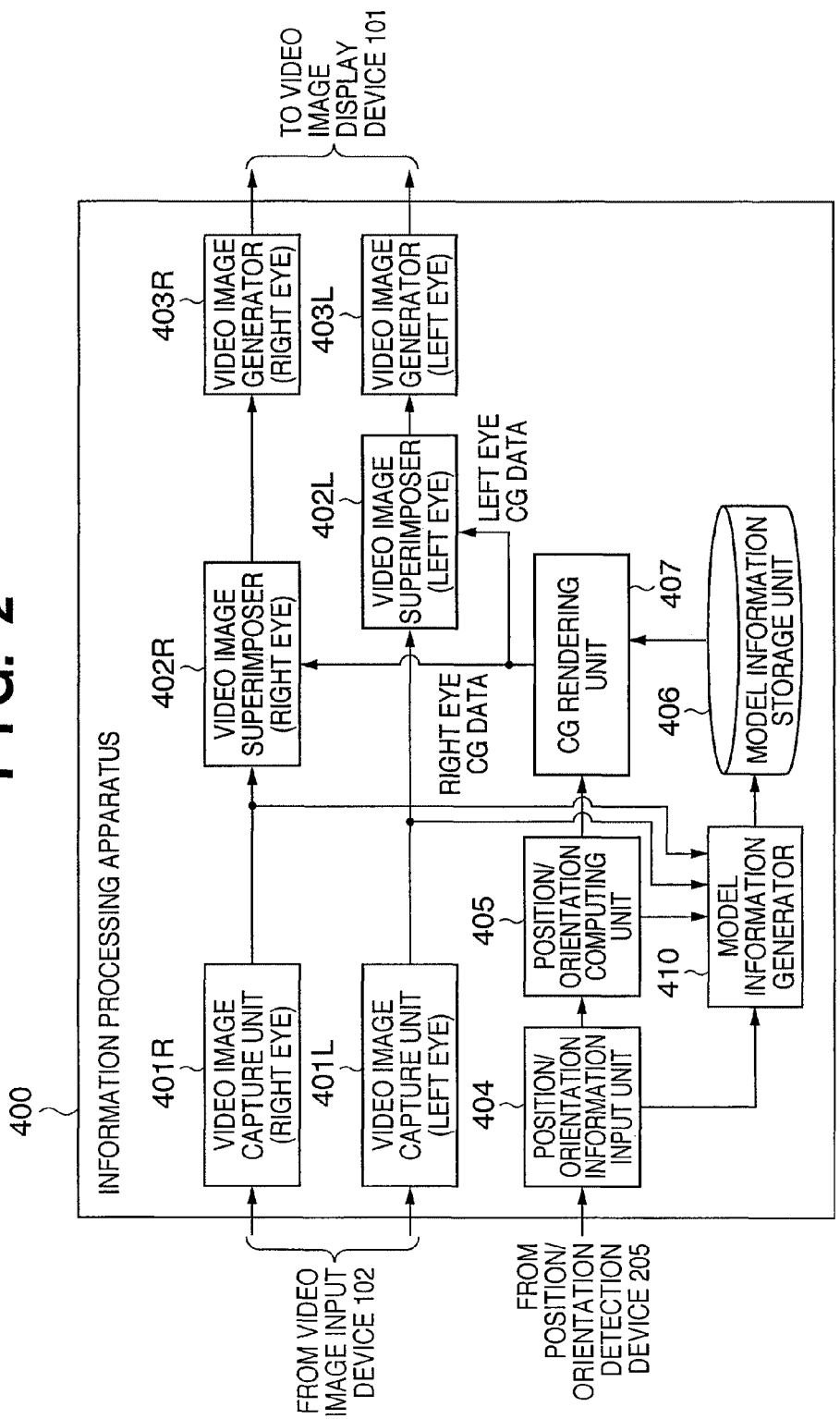
FIG. 2 is a block diagram showing an example configuration of an information processing apparatus 400 shown in FIG. 1.

FIG. 2 is a block diagram showing an example configuration of the information processing apparatus 400 shown in FIG. 1.

It should be noted that, in the following description, where there is no special difference between processing related to the image for the right eye and processing related to image for the left eye, they are described collectively. In such case, even when the structure that processes the image for the right eye and the structure that processes the image for the left eye are shown as different functional blocks, they are described as if processing is done by a single block. Nevertheless, it is to be understood that, in actuality, the same processes are being carried out in each of the functional blocks. Specifically, for example, where there is no special difference between processing performed by a video image capture unit 401R, which captures the image for the right eye, and a video image capture unit 401L, which captures the image for the left eye, such processing is described simply as video image capture unit 401 processing.

The video image capture unit 401 acquires video image signals input by the video image input device 102 that is a stereo camera provided on the HMD 100 as digital signals. A position/orientation information input unit 404 is a position/orientation information input unit for reading into the information processing apparatus 400 position/orientation data for the HMD 100, the tray 300, and the observer's hand sent from the position/orientation detection device 205.

A model information storage unit 406 stores three-dimensional model information for a virtual object. Three-dimensional model information includes shape information, beginning with three-dimensional coordinate information for the virtual object, as well as visual information, such as texture, color, transparency, and the like. There is no particular limitation on the three-dimensional model information, and any known model information can be used. Therefore, a more detailed description thereof shall be omitted.

In the present embodiment, the model information storage unit 406 stores at least three-dimensional model information for the virtual object that is superimposed on the tray 300 and three-dimensional model information for the hand that a model information generator 410 described later generates.

A position/orientation computing unit 405 computes relative three-dimensional positions of the HMD 100 (the viewpoint position of the observer) and the tray 300 based on input data from the position/orientation information input unit 404. From the relative positions computed by the position/orientation computing unit 405, a CG rendering unit 407 computes the position, size, angle (parse) and so forth of the CG that should be rendered, and renders the virtual object using the three-dimensional model information stored in the model information storage unit 406.

An image superimposer 402 superimposes the CG video image generated at the CG rendering unit 407 on video image data of physical space captured at the video image capture unit 401 and generates a superimposed image. The video image generator 403 converts the superimposed image into video image signals that the video image display device 101 can display, and outputs the video image signals to the video image display device 101. A model information generator 410, based on the video image data of physical space captured by the video image capture unit 401, generates three-dimensional model information of the observer's hand and stores the information in the model information storage unit 406.

The above-described information processing apparatus 400 may be implemented, for example, by executing a control program for implementing the above-described functions on hardware combining an ordinary computer, commercially available as a personal computer, and a video input-output board and the like.

For example, a prototype represented by CG is superimposed on the tray 300, and in response to the observer changing the angle of the tray 300 or changing the relative distance to the HMD 100, the CG rendering is revised, thus enabling the observer to confirm the shape of the prototype exactly as if he or she were manipulating the prototype by hand. Of course, by carrying out displays corresponding to more complicated manipulation, inspection of not just external appearance but even usability can be carried out. However, as this matter is not directly related to the present invention, a more detailed description thereof shall be omitted.

(Operation of the Model Information Generator)

Figure 5:
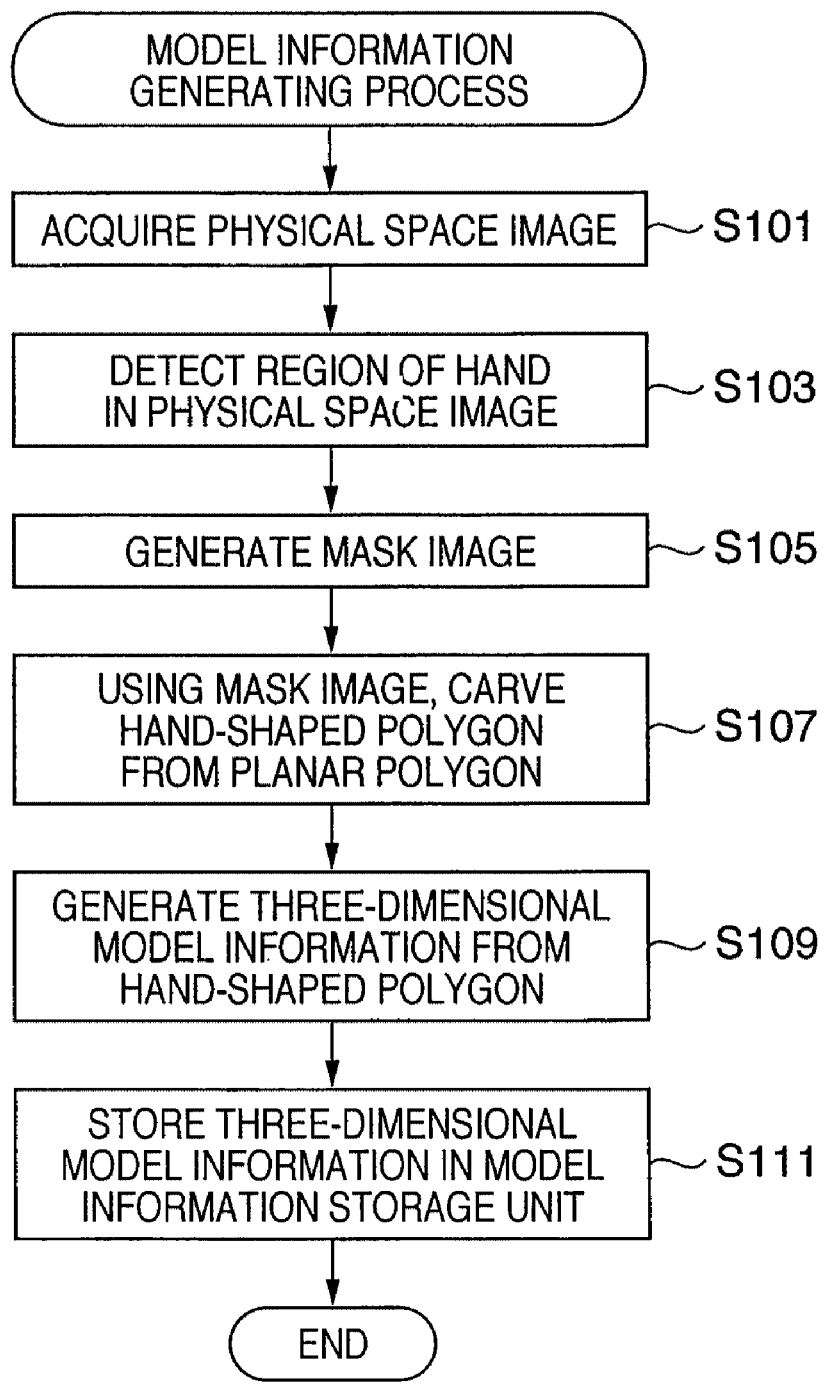
FIG. 5 is a flow chart illustrating operation of the model information generator 410 of an embodiment of the present invention.

A description is now given of the operation of the model information generator 410 of the present embodiment, with reference to the flowchart shown in FIG. 5.

First, the model information generator 410 acquires a video image of physical space from the video image capture unit 401 (S101).

Then, the model information generator 410, from the video image of physical space, detects a region of the hand of the observer that is a physical object which generates three-dimensional model information (S103). There is no particular limitation on the method for detecting the region of the hand, and thus detection is possible, for example, by extracting a continuous region of pixels having a color previously registered as the color of skin.

Figure 3A:
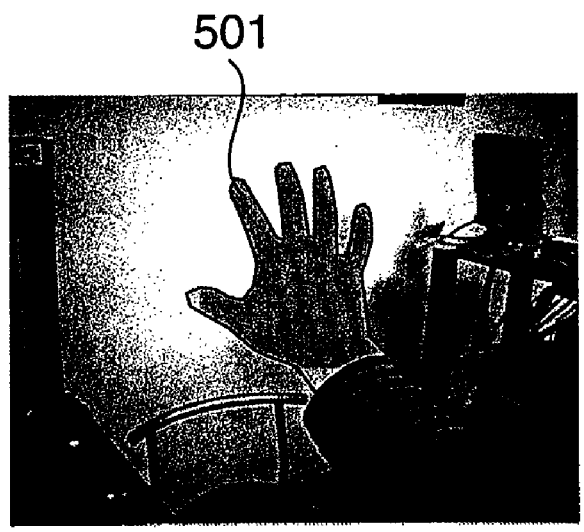
FIGS. 3A and 3B are diagrams showing schematically operation of a model information generator 410 of an embodiment of the present invention.

Next, the model information generator 410 generates a region image extracting only the detected hand region (a mask image) (S105). For example, in FIG. 3A, the region image picking out only a hand region 501 portion is the mask image.

Figure 3B:
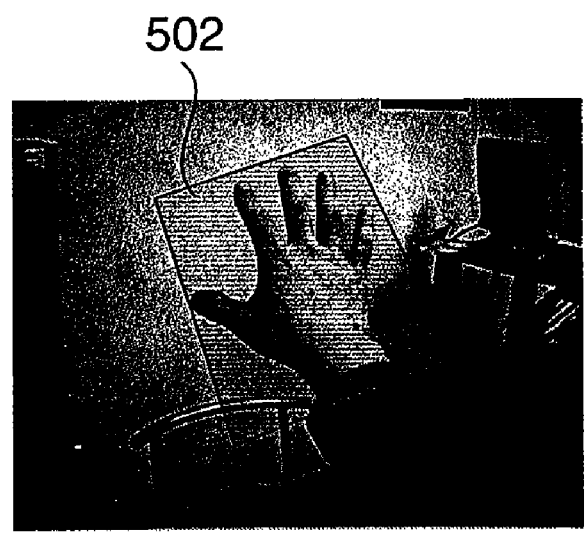

Subsequently, the model information generator 410 generates a single primitive virtual object according to the position and orientation of the hand using the position and orientation information of the observer's hand acquired from the position/orientation information input unit 404. Here, the primitive virtual object is called a pre-processing polygon. Provided that it has a size sufficient to encompass the hand region (the mask image), there are no particular limitations on the overall size and shape of the pre-processing polygon. However, a simple shape poses less of a processing burden than does a complicated shape, and for that reason is preferable. In the present invention, a rectangular or planar pre-processing polygon is used. Moreover, given that the region image is a two-dimensional figure, the pre-processing polygon need not have thickness, although a pre-processing polygon having thickness may be used. FIG. 3B shows an example of a pre-processing polygon 502.

Figure 4A:
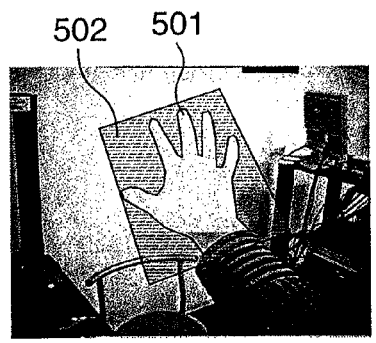
FIGS. 4A-4C are diagrams showing schematically operation of a model information generator 410 of an embodiment of the present invention.
Figure 4B:
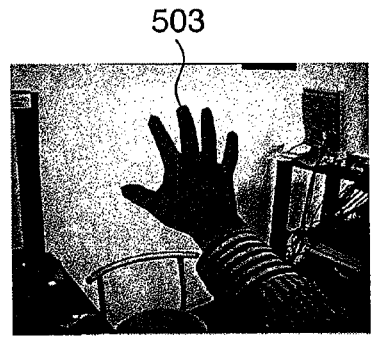

Next, the model information generator 410 generates a virtual object (a hand-shaped polygon) of a shape corresponding to the region image of the hand from the pre-processing polygon by calculating using the mask image of the hand and the pre-processing polygon. Specifically, by using the mask image to carve the pre-processing polygon, the model information generator 410 generates the hand-shaped polygon (S107). FIG. 4A and FIG. 4B show schematically the carving process. Indicated by reference numeral 503 in FIG. 4B is the hand-shaped polygon generated by carving.

Further, as necessary the model information generator 410 determines the thickness of the hand-shaped polygon 503 and gives the hand-shaped polygon 503 the determined thickness.

The model information generator 410 then generates three-dimensional model information according to the hand-shaped polygon 503 (S109).

Here, for example, when generating the pre-processing polygon 502 having a thickness according to the orientation of the hand, or determining that there is little or no sense of incongruence when thicknesses ignored, such as when the line of sight direction with respect to the palm of the hand or the back of the hand is nearly vertical, there is no need to determine the thickness of the hand-shaped polygon 503. Or, there may be occasions when one wishes to give priority to processing speed, or, depending on the application, there is no problem even if there is no thickness.

The three-dimensional model information ultimately generated is stored from the model information generator 410 into the model information storage unit 406 (S111). This series of processes is repeated with a frequency such as to be able track the motions of the observer's hand without a sense of incongruence. Although tracking is best if this series of processes is carried out for each frame that the video image capture unit 401 captures, is not as necessary to so process at every frame.

Figure 4C:
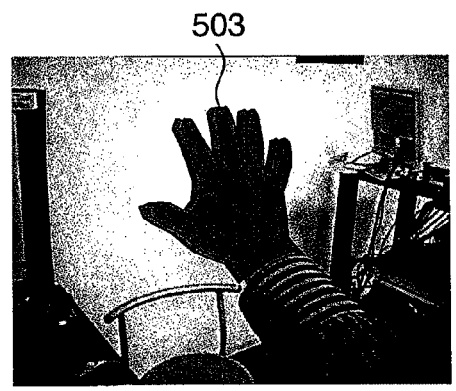

FIG. 4C shows schematically a state in which the CG image of the hand rendered on the basis of the three-dimensional model information generated from the hand-shaped polygon 503 ultimately generated is superimposed on the video image of physical space.

Thus, as described above, the present embodiment makes it possible to generate three-dimensional model information for the purpose of displaying a physical object as a three-dimensional virtual object according to the viewpoint position and the orientation of an observer by the simple processes of detecting the region of the physical object and carving a polygon. There is no need to attach a bending sensor to the observer's hand, nor is there any need for complex calculations such as predicting the motion of the hand from an image. As a result, even in a system that requires real-time processing, a virtual hand having a shape of sufficient accuracy can be rendered with good tracking of the motion of the observer's hand.

It should be noted that, in the present embodiment, a description is given of an example of a system that uses magnetic sensors as means to detect position/orientation. However, provided that it can detect position and orientation, any other method, such as one involving optical sensors, may be used.

In addition, it is possible to use for the pre-processing polygon a polygon having another shape, such as a disc-shaped polygon or a cube-shaped polygon, and to carve it with the mask image.

Further, although in the present embodiment a description is given of an observer's hand as an example of a physical object that generates three-dimensional model information, as can be appreciated by those skilled in the art the range of application of the present invention is not limited to generating three-dimensional model information of a hand. The method of the present invention is applicable to generating three-dimensional model information for any physical object that can be extracted from a physical image according to the viewpoint position and orientation (line of sight direction) of the observer.

The embodiments described above can also be implemented as software by a system or an apparatus computer (or CPU, MPU or the like).

Therefore, a computer program supplied to a computer in order to implement the embodiment described above by such computer itself also implements the present invention. That is, a computer program for implementing the function of the embodiment described above is itself within the scope of the present invention.

It should be noted that a computer program for implementing the embodiment described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-47883, filed on Feb. 27, 2007, which is hereby incorporated by reference herein in its entirety.

What is claimed is:

1. A method for generating a virtual space object which has a similar shape as a predetermined physical space object, comprising:
   an input step of inputting a captured image in which said physical space object is captured;
   an extraction step of extracting a region of said physical space object from said captured image;
   a generation step of generating an initial virtual space object having a position and orientation corresponding to a position and orientation of said physical space object, said virtual space object having a size to encompass said extracted region;
   a cutoff step of generating a cut off virtual space object by cutting off part of the initial virtual space object existing at positions not corresponding to said extracted region from a viewpoint from which said captured image is captured;
   a composition step of generating a composite image of said captured image and a virtual image of the cut off virtual space object, and
   an output step of outputting said composite image.

2. The method according to claim 1, wherein said generation step generates said initial virtual space object having no thickness.

3. The method according to claim 2, further comprising a thickness provision step of providing thickness to the cut off virtual space object; and
   wherein said composition step of generating a composite image of said captured image and a virtual image of the cut off virtual space object which is provided the thickness.

4. The method according to claim 1, wherein said generation step generates said initial virtual space object having a thickness according to the orientation of said physical space object.

5. An apparatus for generating a virtual space object which has a similar shape as a predetermined physical space object, comprising:
   an input unit which inputs a captured video image in which said physical space object is captured;
   an extraction unit which extracts a region of said physical space object from said captured image;
   a generation unit which generates an initial virtual space object having a position and orientation according to a position and orientation of said physical space object, said virtual space object having a size to encompass said extracted region;
   a cutoff unit which generates a cut off virtual space object by cutting off part of the initial virtual space object existing at positions not corresponding to said extracted region from a viewpoint from which said captured image is captured; and
   an output unit which outputs said composite image.

6. A non-transitory computer-readable recording medium on which is recorded a program for causing a computer to execute the method according to claim 1.

7. The method according to claim 1, wherein the virtual object moves following to the physical object, and
   the method further comprising:
   a repeat input step of inputting another captured image including said physical space object which has moved in the position and/or orientation from the position and/or orientation at which the virtual space object was captured said captured image on the input step;

a repeat extraction step of extracting a second region of the physical space object which has moved, from the other captured image input in said repeat input step; and a repeat cutoff step of further cutting off part of the cut off virtual space object existing at positions not corresponding to said second region from a viewpoint from which said the other captured image is captured.

8. The method according to claim 7 further comprising:

a repeat composition step of generating a second composite image of the other captured image which input in said repeat input step and a virtual image of the cut off virtual space object which is further cut off in the repeat cutoff step; and a repeat output step of outputting said composite image generated in said repeat composition step.

9. The method according to claim 7, further comprising:

a measurement step of measuring a position and orientation of said physical space object;

wherein the virtual space object moves based on said measured position and orientation in order to follow a movement of the physical space object.

10. The method according to claim 9, wherein said measurement step measures said position and orientation based on an output from a sensor which attached on the physical flat object for laying said physical space object on said physical flat object.

* * * * *